(12) United States Patent
Zillich et al.

(10) Patent No.: US 10,158,141 B2
(45) Date of Patent: Dec. 18, 2018

(54) FUEL CELL SYSTEM INCLUDING MULTIPLE FUEL CELL STACKS

(71) Applicant: Volkswagen AG, Wolfsburg (DE)

(72) Inventors: Christian Martin Zillich, Braunschweig (DE); Friedhelm Walkling, Braunschweig (DE)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 292 days.

(21) Appl. No.: 14/993,874

(22) Filed: Jan. 12, 2016

(65) Prior Publication Data

US 2016/0204461 A1 Jul. 14, 2016

(30) Foreign Application Priority Data

Jan. 14, 2015 (DE) .................. 10 2015 200 427

(51) Int. Cl.
| | | |
|---|---|---|
| *H01M 8/24* | (2016.01) | |
| *H01M 8/2483* | (2016.01) | |
| *H01M 8/2457* | (2016.01) | |
| *H01M 8/241* | (2016.01) | |
| *H01M 8/249* | (2016.01) | |
| *H01M 8/1018* | (2016.01) | |

(52) U.S. Cl.
CPC ......... *H01M 8/2483* (2016.02); *H01M 8/241* (2013.01); *H01M 8/249* (2013.01); *H01M 8/2457* (2016.02); *H01M 2008/1095* (2013.01); *H01M 2300/0082* (2013.01)

(58) Field of Classification Search
CPC .. H01M 8/2483; H01M 8/249; H01M 8/2457; H01M 8/241; H01M 2008/1095; H01M 2300/0082

USPC ......................................................... 429/458
See application file for complete search history.

(56) References Cited

U.S. PATENT DOCUMENTS

| | | | |
|---|---|---|---|
| 6,110,612 | A | 8/2000 | Walsh et al. |
| 7,108,929 | B2 | 9/2006 | Kurtz et al. |
| 7,648,793 | B2 | 1/2010 | Sate et al. |
| 8,221,931 | B2 | 7/2012 | Sugita et al. |
| 2003/0235740 | A1* | 12/2003 | Haltiner, Jr. ........ H01M 8/2425 429/459 |

(Continued)

FOREIGN PATENT DOCUMENTS

| | | |
|---|---|---|
| DE | 100 41 532 | 3/2001 |
| DE | 102004047944 | 6/2005 |
| DE | 10 2004 060 526 | 6/2006 |

(Continued)

*Primary Examiner* — Gary D Harris
(74) *Attorney, Agent, or Firm* — Davidson, Davidson & Kappel, LLC

(57) ABSTRACT

A fuel cell system (100), which includes multiple fuel cell stacks (10, 20) having a pair of adjacent fuel cell stacks (10, 20), namely a first fuel cell stack (10) and a second fuel cell stack (20), each including multiple fuel cells (2), as well as multiple main channels (11, 12, 13) which penetrate the fuel cell stacks (10, 20) for distributing the operating agents to the individual fuel cells (2) is provided. It is provided that the fuel cell stacks (10, 20) of one pair are situated in such a way that a sequence of the main channels (11, 12, 13) is mirror-symmetrical to a plane running between the adjacent fuel cell stacks (10, 20) of the pair, with respect to the different operating agents.

9 Claims, 2 Drawing Sheets

(56) References Cited

U.S. PATENT DOCUMENTS

2004/0253499 A1* 12/2004 Sato .................. H01M 8/02
                                                                          429/434

FOREIGN PATENT DOCUMENTS

| | | |
|---|---|---|
| DE | 11 2004 001 759 | 10/2006 |
| EP | 1 127 382 B1 | 8/2001 |
| JP | S6353862 | 3/1988 |

* cited by examiner

FUEL CELL SYSTEM INCLUDING MULTIPLE FUEL CELL STACKS

This claims the benefit of German Patent Application DE102015200427.9, filed Jan. 14, 2015 and hereby incorporated by reference herein.

The present invention relates to a fuel cell system, which includes multiple fuel cell stacks having a pair of adjacent fuel cell stacks, namely a first fuel cell stack and a second fuel cell stack, each including multiple fuel cells having main channels for distributing the operating agents to the individual fuel cells.

BACKGROUND

Fuel cells use the chemical conversion of a fuel into water with the aid of oxygen to generate electrical energy. For this purpose, fuel cells include the so-called membrane electrode assembly (MEA) as a core component, which is an assembly of an ion-conducting (usually proton-conducting) membrane and an electrode (anode and cathode) situated on both sides of the membrane. In addition, gas diffusion layers (GDL) may be situated on both sides of the membrane electrode assembly, on the sides of the electrodes facing away from the membrane. The fuel cell is generally formed by a large number of MEAs situated in a stack, whose electrical powers add up. Bipolar plates (also referred to as flow field plates) are situated between the individual membrane electrode assemblies and ensure a supply of operating agents, i.e., reactants, to the individual cells and are usually also used for cooling. In addition, the bipolar plates ensure an electrically conductive contact to the membrane electrode assemblies.

During the operation of a polymer electrolyte membrane (PEM) fuel cell, the fuel, in particular hydrogen $H_2$ or a hydrogen-containing gas mixture is supplied via a flow field of the bipolar plate, which is open on the anode side, to the anode, where an electrochemical oxidation of $H_2$ to $H^+$ takes place with the discharge of electrons. A (water-bound or water-free) transfer of protons $H^+$ from the anode space to the cathode space takes place via the electrolyte or the membrane, which separates and electrically insulates the reaction spaces from each other in a gas-tight manner. The electrons provided at the anode are supplied to the cathode via an electric line. Oxygen or an oxygen-containing gas mixture (for example air) is supplied to the cathode via a flow field of the bipolar plate, which is open on the cathode side, so that a reduction from $O_2$ to $O^{2-}$ takes place with the absorption of the electrons. At the same time, in the cathode space, the oxygen anions react with the protons transferred via the membrane, forming water.

A fuel cell stack includes at least two main channels for each operating agent (anode operating gas, cathode operating gas, coolant), namely at least one supplying main channel and at least one discharging main channel in each case. The main channels extend through the entire stack and supply the individual fuel cells with the operating agents (also referred to as operating media).

To supply a fuel cell stack with its operating agents, the fuel cell stack includes an anode supply system on the one hand and a cathode supply system on the other hand. The anode supply system includes an anode supply path for supplying an anode operating gas to the anode spaces and an anode exhaust gas path for discharging an anode exhaust gas from the anode spaces. The anode supply path is fluid-conductively connected to the corresponding supplying main channel for the anode operating gas, and the anode exhaust gas path is fluid-conductively connected to the corresponding discharging main channel of the stack. Likewise, the cathode supply system includes a cathode supply path for supplying a cathode operating gas to the cathode spaces and a cathode exhaust gas path for discharging a cathode exhaust gas from the cathode spaces of the fuel cell stack. A cathode supply path is fluid-conductively connected to the corresponding supplying main channel for the cathode operating gas, and the cathode exhaust gas path is fluid-conductively connected to the corresponding discharging main channel of the stack. A cooling circuit for the fuel cell stack is connected to the corresponding supplying and discharging main channels of the fuel cell stack for the purpose of conducting a coolant through the stack and dissipating the reaction heat.

When a fuel cell system is used, for example in a motor vehicle, a considerable quantity of individual fuel cells is needed to be able to provide the desired electrical energy. The problem arises that the length of the fuel cell stack increases significantly in the stack direction, and it becomes difficult to uniformly supply the operating gases, in particular the anode operating gas, to the particular fuel cell units.

It is therefore known to use a fuel cell system which is constructed from a plurality of fuel cell stacks. The plurality of fuel cell stacks is situated either in series or in parallel to each other.

DE 10 2004 060 526 A1 discloses a plurality of fuel cell stacks situated in series, in which the fuel cell stacks are connected to each other by their facing end plates. This gives rise to the problem that the length of the fuel cell stack increases significantly in the stack direction, and it becomes difficult to uniformly supply the operating agents to the individual fuel cell units.

In contrast, EP 1 127 382 B1 and DE 100 41 532 B4 disclose a plurality of fuel cell stacks which are situated in parallel to each other and are supplied with operating media via shared supply lines to the main channels.

To optimize the supply of operating media, DE 11 2004 001 759 T5 describes a media adapter plate for distributing operating media to multiple parallel-connected fuel cell stacks for the purpose of creating a more compact power generating system and to uniformly distribute and collect or combine reactants for each fuel cell stack in one power generating system. Identical fuel cell stacks are situated next to each other for this purpose.

SUMMARY OF THE INVENTION

The disadvantage of known multiple stack systems is that the distribution of operating media to the individual fuel cell stacks requires a high tubing complexity and additionally enlarges the structure of the fuel cell system, in particular in the stack direction, due to overlaps or crossovers of the individual supply lines for different operating media and thus undesirably increases the space requirements of the fuel cell system.

It is an object of the present invention to provide a fuel cell system, which includes multiple fuel cell stacks and which solves or at least reduces the problems of the prior art. In particular, a fuel cell system is to be provided, which takes up much less installation space compared to the prior art, while uniformly distributing operating media.

The present invention provides to a fuel cell system, which includes multiple fuel cell stacks having a pair of adjacent fuel cell stacks, namely a first fuel cell stack and a second fuel cell stack, each including multiple fuel cells, as well as multiple main channels which penetrate the fuel cell stacks for distributing the operating agents to the individual fuel cells. According to the present invention, it is provided that the fuel cell stacks of one pair are situated in such a way that a sequence of the main channels is mirror-symmetrical to a plane running between the adjacent fuel cell stacks of the pair, with respect to the different operating agents.

The advantage of a fuel cell system according to the present invention is a very low tubing complexity of the operating agents. The present invention makes it possible, in particular, to supply the operating agents to the two fuel cell stacks via a shared supply line. In particular, a crossover of the supply lines may be completely or partially prevented due to the mirror-symmetrical arrangement of the operating media, so that a height of the fuel cell system is reduced.

The fuel cells of the fuel cell system according to the present invention include a cathode as well as an anode, which are supplied with cathode operating gas or anode operating gas. The fuel cells are furthermore supplied with coolant via a coolant system. In the present case, therefore, operating agents (or operating media) are understood to be, in particular, three operating agents, namely cathode operating gas, anode operating gas as well as coolant. The operating agents are distributed to the individual fuel cells via main channels, namely at least one supplying and one discharging cathode main channel, at least one supplying and one discharging anode main channel and at least one supplying and one discharging coolant main channel in each case. These main channels are situated according to the present invention in such a way that they are situated mirror-symmetrically with respect to a sequence. The mirror plane is an imaginary plane which extends between two adjacent fuel cell stacks of one pair and does not intersect any of the two fuel cell stacks.

The mirror symmetry relates only to the sequence of the system of main channels. This means that, according to the present invention, it is not necessary for the absolute position of the main channels to be mirror-symmetrical, but instead that the sequence of individual main channels, starting from the fictitious mirror plane, is consistent.

The supplying main channels of a fuel cell stack and the discharging main channels of the same fuel cell stack form a distribution area. The two distribution areas of the fuel cell stack are situated adjacent to each other. In principle, the configuration of the flow direction within the main channels is not important for the operability of the fuel cell system according to the present invention, i.e., which of the distribution areas is used as the inlet and which of the distribution areas is used as the outlet.

In one preferred embodiment of the present invention, however, it is provided that each fuel cell stack of the pair includes at least two main channels for each operating agent, namely at least one supplying main channel and at least one discharging main channel. The fuel cell stacks of the pair are preferably situated in such a way that the sequence of the supplying main channels of the first fuel cell stack is mirror-symmetrical to the sequence of the supplying main channels of the second fuel cell stack, and the sequence of the discharging main channels of the first fuel cell stack is mirror-symmetrical, relative to the plane, to the sequence of the discharging main channels of the second fuel cell stack, with respect to the different operating agents in each case. This embodiment has the advantage that, in particular, existing fuel cell systems may be used, i.e., such systems which have been optimized to the flow direction with respect to the design of the channels and/or the fuel cells in the fuel cell stack. This means, for example, that fuel cell stacks are situated with respect to a pair of adjacent fuel cell stacks, which have a constriction or a widening of the diameter of at least one of the main channels for the purpose of optimizing pressure losses along the extension direction of the fuel cell stack. For these main channels, it is particularly advantageous if the distribution areas designed as inlets also function as an inlet in the fuel cell system according to the present invention.

In another preferred embodiment of the present invention, it is provided that the fuel cell stacks have a polarity across their stack direction, and the fuel cell stacks of the pair are situated in such a way that a negative pole of the first fuel cell stack is adjacent to a positive pole of the second fuel cell stack. A greatly reduced cabling complexity of the electrical connection of the electrically series-connected fuel cell stacks is achieved thereby. Polarity is understood to be the fact that the current flow within the adjacent fuel cell stacks of one pair runs in different directions, in particular counter to each other, i.e., on the one hand, the minus poles of the cells point in opposite directions and, on the other hand, the cathode spaces and the anode spaces of the individual fuel cells of the individual fuel cell stacks are situated in opposite sequence.

The supplying main channel for one operating agent of the first fuel cell stack is advantageously connected to the supplying main channel of the same operating agent of the second fuel cell stack via a shared supply line. The advantage of this embodiment is a further reduced tubing complexity. In addition, the same output parameters, in particular pressure, may be ensured for the two adjacent fuel cell stacks of one pair.

A connecting line of this type is preferably present only at one end of the stack. The adjacent fuel cell stacks of one pair are not connected to each other at the second end, but instead the two distribution areas, the supplying main channel and the discharging main channel of a fuel cell stack, are connected to each other at this end via fluid-conducting connections. This connection is preferably situated in one of the end plates of the particular fuel cell stack.

It is furthermore preferred that the supply line includes hoses and/or rigid tubes. The advantage of using hoses is that they are flexible and take up less space due to smaller bending radii. Hoses also appear to be more tolerant of pressure and tension as well as possible shocks. The advantage of using tubes, on the other hand, is that they are more stable and thus require less maintenance. The course of the supply lines is determined by the individual bending radii both when using hoses and when using tubes.

The supply line advantageously includes a main supply line, which forms partial supply lines at a branching point, which empty into the corresponding main channels. The advantage of this embodiment lies, in particular, in short paths of the supply lines and thus in reduced tubing, in particular compared to fluidically series-connected, parallel-situated fuel cell stacks. The partial supply lines preferably have essentially the same length to ensure a homogeneous supply of the two fuel cell stack adjacent to each other. It is furthermore preferred that the partial supply lines are designed to be a short as possible. To ensure this, the branching point is preferably situated on the mirror plane in an area between the partial supply lines.

It is furthermore preferred that the main supply lines are situated essentially perpendicularly to the partial supply lines. This is advantageous, in particular, if the partial supply lines run perpendicularly to the stack direction. The course of the partial supply lines is also preferably symmetrical to the mirror plane between the fuel cell stacks. In one particularly preferred embodiment of the present invention, it is provided that the partial supply lines are situated in a plane, preferably perpendicularly to the stack direction. This yields the advantage that crossovers of the partial supply lines are avoided, and the height of the structure of the fuel cell system is thus reduced. In fact the height of the supply area, i.e., the area which includes the partial supply lines, is defined by the partial supply line having the largest diameter. This line is usually the coolant line.

In one further preferred embodiment of the present invention, the fuel cell system includes a media adapter plate for accommodating the partial supply lines, which connects the adjacent fuel cell stacks and which is situated perpendicularly to the stack direction at one end of the fuel cell stack. The arrangement of the media adapter plate facilitates a particularly compact arrangement of the supply lines, in particular the partial supply lines, as well as their stabilization. This advantageously goes hand in hand with production advantages involving preferably precise manufacturing with fewer manufacturing tolerances. The main supply line is preferably not, or only partially, encompassed by the media adapter plate. In fact, the media adapter plate includes the partial supply lines as well as the branching point and connecting means for the main supply line as well as fluid-conducting connecting elements between the partial supply lines and the corresponding main channels of the particular fuel cell stack.

It is preferred, in particular, that the media adapter plate includes discrete channels for conducting operating agents, which form or accommodate the partial supply lines. The discrete channels are, for example, a profile structure within the media adapter plate or bores. The individual operating agents are conducted separately through the channels, and the operating agents are not mixed with each other. The height of the media adapter plate is preferably determined by the diameter of one of the partial supply lines, namely the partial supply line having the largest diameter. The height of the media adapter plant preferably has a low design and exceeds the diameter of the thickest partial supply line by an absolute amount which is necessary for the purpose of stabilizing the plate or the channels.

The different specific embodiments of the present invention mentioned in this application may be advantageously combined with each other unless otherwise indicated in the individual case.

BRIEF DESCRIPTION OF THE DRAWINGS

The present invention is explained below in exemplary embodiments on the basis of the corresponding drawings.

DETAILED DESCRIPTION

Figure 1:
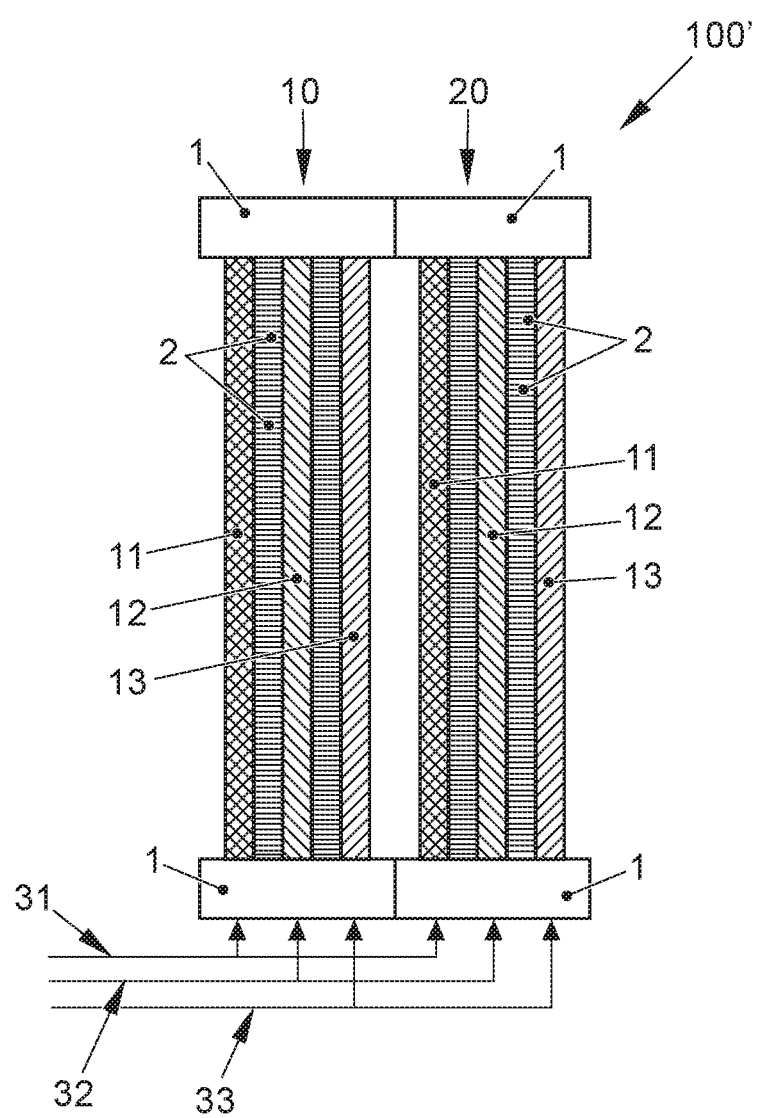
FIG. 1 shows a schematic representation of a pair of adjacent fuel cell stacks according to the prior art.

FIG. 1 shows a fuel cell system 100' according to the prior art. Fuel cell system 100' includes two fuel cell stacks 10 and 20, which are situated in parallel to each other. Each fuel cell stack 10, 20 is constructed from a large number of stacked fuel cells 2. Each fuel cell stack 10, 20 includes an anode space as well as a cathode space, which are separated from each other by an ion-conductive polymer electrolyte membrane. The anode and cathode spaces each include a catalytic electrode, the anode or the cathode, which catalyzes the particular partial reaction of the fuel cell conversion. A large number of individual cells of this type are usually situated in stacked form in a fuel cell stack, a bipolar plate being situated between two membrane electrode assemblies, which is used to supply operating media to the anode and cathode spaces and which furthermore establishes the electrical connection between the individual fuel cells. Fuel cell stack 10, 20 is terminated at both ends by an end plate 1. These end plates 1 may be connected and fixed by tensioning or clamping elements (not illustrated). Each of fuel cell stacks 10, 20 also includes multiple main channels 11, 12 and 13, which extend within the fuel cell stack in the stack direction.

FIG. 1 shows a side view of one pair of adjacent fuel cell stacks 10, 20. One part of main channels 11, 12, 13 is thus shown, for example the inlets for three operating agents. Other main channels 11, 12, 13, for example the outlets for the operating agents, are hidden and are therefore not shown. Each fuel cell stack 10, 20 includes at least one supplying and one discharging main channel 11, 12, 13 for each operating agent. In the specific embodiment illustrated, one fuel cell stack 10, 20 includes three operating media, namely anode operating gas, cathode operating gas and coolant, whose supplying main channels are apparent in FIG. 1.

The operating media of fuel cell stacks 10 and 20 are cathode operating gas, anode operating gas and coolant. The anode operating gas is, for example, a fuel, such as hydrogen; the cathode operating gas is an oxidizing agent needed for the fuel cell reaction, such as oxygen, which is available in the form of air. Another operating agent, which is not directly required for the fuel cell reaction, is coolant, which is also transported in one of the main channels.

In the illustrated representation of a multiple fuel cell stack 100' according to the prior art, multiple fuel cell stacks 10 and 20 are situated next to each other in the same orientation. The sequence of main channels 11, 12 and 13 of the first fuel cell stack therefore corresponds to the sequence of main channels 11, 12 and 13 of the second fuel cell stack. This results in the fact that supply lines 31, 32 and 33, with the aid of which corresponding main channels 11, 12 and 13 are supplied with the particular operating agent, cross each other multiple times.

Figure 2:
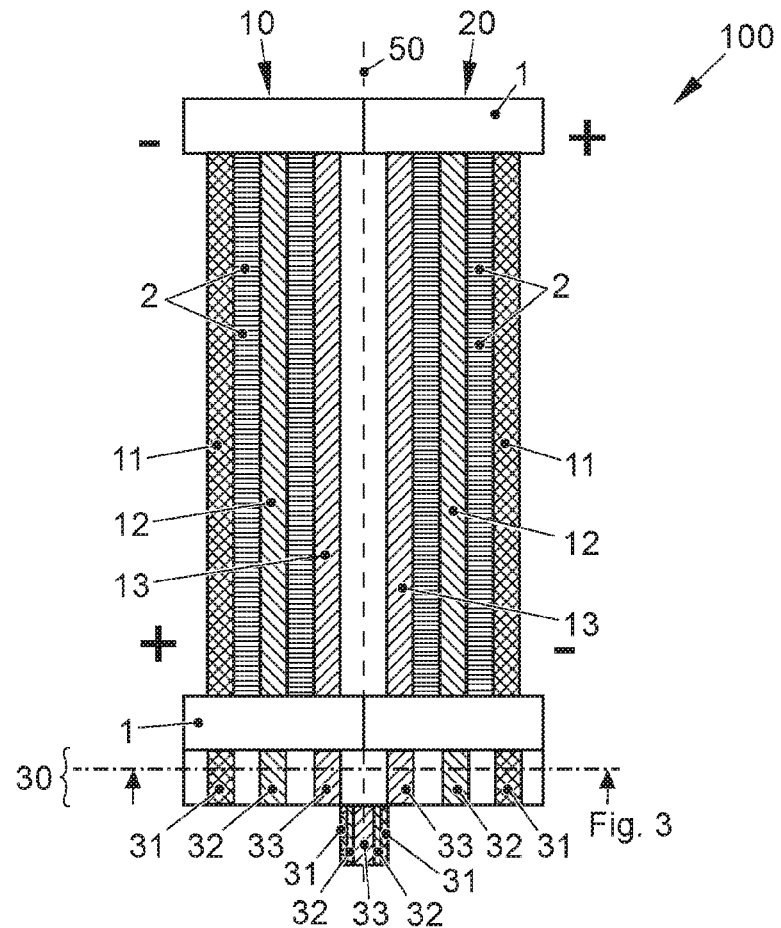
FIG. 2 shows a schematic representation of a pair of adjacent fuel cell stacks in one preferred embodiment of the present invention.

FIG. 2 shows a fuel cell system 100 in one preferred embodiment of the present invention. Fuel cell system 100 illustrated in FIG. 2 includes two fuel cell stacks 10 and 20, which are situated in parallel to each other. The design of fuel cell stacks 10, 20 essentially corresponds to that of fuel cell system 100' in FIG. 1. Each of the two fuel cell stacks 10 and 20 is constructed from multiple stacked fuel cells 2, which are terminated by an end plate 1 at their upper and lower ends.

A plane 50 extends between first fuel cell stack 10 and second fuel cell stack 20. This plane is ideally oriented in parallel to the adjacent sides of the two fuel cell stacks 10 and 20 and thus does not intersect them. However, the plane may also be slightly inclined, so that it is slightly inclined with respect to the sides of the two fuel cell stacks 10 and 20 and thus does not run in parallel and, however, does not intersect them.

According to the present invention, plane 50 represents a mirror plane for the sequence of main channels 11, 12 and 13. This means that, starting from mirror plane 50, the arrangement of main channels 11, 12 and 13 of first fuel cell stack 10 is identical to the arrangement of main channels 11, 12 and 13 of second fuel cell stack 20. In the illustrated embodiment in FIG. 2, the supplying main channel for cathode operating gas 13 is situated both in first fuel cell stack 10 and in second fuel cell stack 20 in close proximity to plane 50, so that the distance from the plane is also the smallest compared to the distance of other main channels 11 and 12. The supplying main channel for anode operating gas 12 is situated at a greater distance from plane 50 than the supplying main channel for cathode operating gas 13, and the supplying channel for coolant 11 has the greatest distance from plane 50 in both fuel cell stacks 10 and 20. The sequence for cathode operating gas 13, for anode operating gas 12 and finally for coolant 11 thus results for supplying main channels 11, 12, 13, starting from plane 50 in both fuel cell stacks 10 and 20.

Supply lines 31, 32 and 33, which externally supply individual main channels 11, 12 and 13 with the operating agents, cathode operating gas, anode operating gas and coolant, are situated at one end of the pair of stacks. Moreover, supplying main channels 11, 12 and 13 of first fuel cell stack 10 are connected in this area, supply area 30, to supplying main channels 11, 12 and 13 of second fuel cell stack 20 via a supply line 31, 32 and 33 in each case. The same applies to the discharging main channels. Within supply area 30, in which supply lines 31, 32 and 33 are situated, supply lines 31, 32 and 33 have the same sequence with respect to plane 50 as corresponding main channels 11, 12 and 13 within the fuel cell stack. Supply area 30 may have an open design, or it may be at least partially integrated into a media adapter plate.

Figure 3:
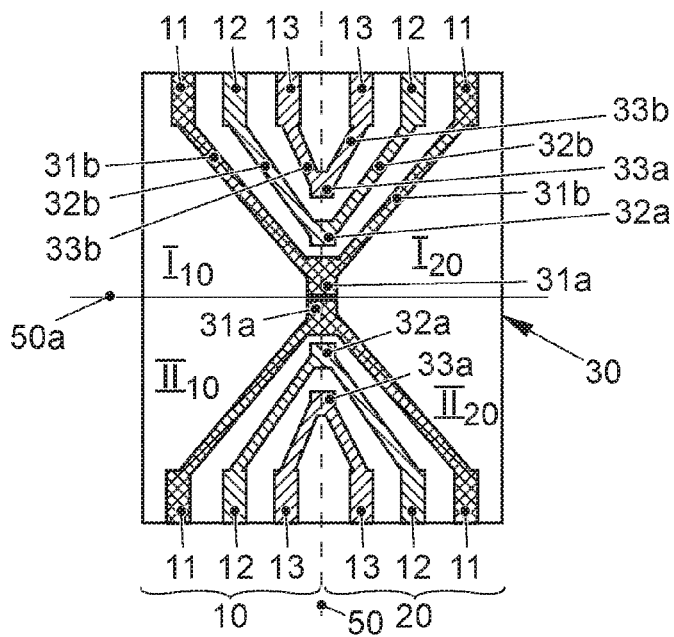
FIG. 3 shows a schematic representation of a longitudinal section of a supply area of a fuel cell system in the preferred embodiment of the present invention.

FIG. 3 shows a detailed representation in a top view of an intersection of the supply area, which is situated perpendicularly to plane 50. In this plane, supply area 30 is divided into four sections by plane 50 and by another plane situated perpendicularly to plane 50. These sections correspond to a first distribution area I for supplying main channels and a second distribution area II for discharging main channels, which are assigned to first fuel cell stack 10 and to second fuel cell stack 20. Each distribution area I and II includes connections to main channels 11, 12 and 13, which belong either to first fuel cell stack 10 or to second fuel cell stack 20. Partial supply lines 31b, 32b and 33b, which are connected to a corresponding main supply line 31a, 32a and 33a, extend from these connecting points. In the most favorable case, main supply lines 31a, 32a and 33a are situated on plane 50, so that, in each case, one main supply line 31a, 32a and 33a is connected to two partial supply lines 31b, 32b and 33b for the particular operating gas. Two corresponding main channels 11 and 11, 12 and 12, 13 and 13 are thus connected to each other via one main supply line 31a, 32a and 33a, which are divided into two partial supply lines 31b, 32b and 33b at a branching point. Partial supply lines 31b, 32b and 33b are thus preferably situated in a plane which corresponds to the illustrated intersection and do not cross each other. Neither crossovers of partial supply lines of the same operating medium nor crossovers of partial supply lines 31b, 32b and 33b of different operating media occur. The arrangement of partial supply lines 31b, 32b and 33b as well as main channels 11, 12 and 13 is mirrored with respect to plane 50 in supply area 30. Thus, first distribution area I of first fuel cell stack 10 is transferred to first distribution area I of second fuel cell stack 20 via mirror plane 50, and second distribution area II of first fuel cell stack 10 is transferred to second distribution area II of second fuel cell stack 20 via plane 50.

In addition to plane 50, supply area 30 also has another mirror plane 50a, which is situated perpendicularly to plane 50. Supply area 30 is divided into two sections by mirror plane 50a, a first section including first distribution areas I, which include the inlet with operating gases. This means that the first section includes the connections to the main channels as well as partial supply lines 31b, 32b and 33b and main supply lines 31a, 32a and 33a, which supply the operating gases to first fuel cell stack 10 and to second fuel cell stack 20. The second section includes second distribution areas II of first and second fuel cell stacks 10 and 20, which ensure the discharge of operating gases. The second section thus includes the connections to main channels 11, 12 and 13 as well as partial supply lines 31b, 32b and 33b and main supply lines 31a, 32a and 33a, from first fuel cell stack 10 and second fuel cell stack 20.

LIST OF REFERENCE NUMERALS 1 end plate
2 fuel cell
10 first fuel cell stack
11, 12, 13 main channel
20 second fuel cell stack
30 supply area (media adapter plate)
31, 32, 33 supply line
31a, 32a, 33a main supply line
31b, 32b, 33b partial supply line
50 plane
50a mirror plane
I first distribution area (inlet)
II second distribution area (outlet)
100' fuel cell system according to the prior art
100 fuel cell system

What is claimed is:
1. A fuel cell system comprising:
a plurality of fuel cell stacks having a pair of adjacent fuel cell stacks including a first fuel cell stack and a second fuel cell stack, each including a plurality of fuel cells as well as a plurality of main channels penetrating the first and second fuel cell stacks for the purpose of distributing operating agents to individual fuel cells of the plurality of fuel cells;
the first and second fuel cell stacks of the pair being situated in such a way that a sequence of the main channels is mirror-symmetrical to a first plane running between the adjacent first and second fuel cell stacks of the pair, with respect to the different operating agents, the main channels including a first fuel stack cathode operating gas channel, a first fuel cell stack anode operating gas channel and a first fuel cell stack coolant channel being mirror symmetrical with a second fuel stack cathode operating gas channel, a second fuel cell stack anode operating gas channel and a second fuel cell stack coolant channel with respect to the first plane; the main channels also being mirror symmetrical to a second plane perpendicular to the first plane so that supply sections of the first fuel cell stack cathode operating gas channel, the first fuel cell stack anode operating gas channel, the first fuel cell stack coolant channel, the second fuel stack cathode operating gas channel, the second fuel cell stack anode operating gas channel and the second fuel cell stack coolant channel are mirror symmetrical with discharge sections of the first fuel cell stack cathode operating gas channel, the first fuel cell stack anode operating gas channel, the first fuel cell stack coolant channel, the second fuel stack cathode operating gas channel, the second fuel cell stack anode operating gas channel and the second fuel cell stack coolant channel with respect to the second plane.

2. The fuel cell system as recited in claim 1 wherein the first and second fuel cell stacks have a polarity across a stack direction, and the first and second fuel cell stacks of the pair are situated in such a way that a negative pole of the first fuel cell stack is adjacent to a positive pole of the second fuel cell stack.

3. The fuel cell system as recited in claim 1 wherein the supply sections of at least one of: (1) the first fuel cell stack cathode operating gas channel and the second fuel stack cathode operating gas channel; (2) the first fuel cell stack anode operating gas channel and the second fuel cell stack anode operating gas channel, and (3) the first fuel cell stack coolant channel and the second fuel cell stack coolant channel are connected via a shared supply line.

4. The fuel cell system as recited in claim 3 wherein the shared supply line includes a flexible hoses or rigid tubes.

5. The fuel cell system as recited in claim 3 wherein the shared supply line includes a main supply line forming partial supply lines at a branching point.

6. The fuel cell system as recited in claim 5 wherein the main supply line is situated essentially perpendicularly to the partial supply lines.

7. The fuel cell system as recited in claim 5 wherein the partial supply lines are situated in a plane.

8. The fuel cell system as recited in claim 5 wherein the fuel cell system includes a media adapter plate for accommodating the partial supply lines, the media adapter plate connecting the adjacent first and second fuel cell stacks being situated perpendicularly to the stack direction at one end of the first and second fuel cell stacks.

9. The fuel cell system as recited in claim 8 wherein the media adapter plate includes discrete channels for conducting the operating agents, the discrete channels forming or accommodating the partial supply lines.

* * * * *